(12) United States Patent
Toda et al.

(10) Patent No.: US 8,976,153 B2
(45) Date of Patent: Mar. 10, 2015

(54) TOUCH PANEL DEVICE DETECTING WATER

(75) Inventors: Hiroshi Toda, Kanagawa (JP); Mitsuru Satou, Kanagawa (JP); Hidekazu Kano, Tokyo (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 99 days.

(21) Appl. No.: 13/877,732

(22) PCT Filed: Oct. 18, 2011

(86) PCT No.: PCT/JP2011/005827
§ 371 (c)(1),
(2), (4) Date: Apr. 4, 2013

(87) PCT Pub. No.: WO2012/053195
PCT Pub. Date: Apr. 26, 2012

(65) Prior Publication Data
US 2013/0207935 A1    Aug. 15, 2013

(30) Foreign Application Priority Data
Oct. 19, 2010 (JP) .................................. 2010-234492

(51) Int. Cl.
*G06F 3/044* (2006.01)
*G06F 3/041* (2006.01)
(52) U.S. Cl.
CPC .............. *G06F 3/044* (2013.01); *G06F 3/0418* (2013.01)
USPC ....................................................... 345/174
(58) Field of Classification Search
CPC ................................ G06F 3/044; G06F 3/0418

USPC ................................. 345/173, 174; 178/18.06
See application file for complete search history.

(56) References Cited

U.S. PATENT DOCUMENTS 8,773,146 B1 * 7/2014 Hills et al. ..................... 345/174
2009/0160780 A1 * 6/2009 Arnold et al. ................. 345/173
(Continued)

FOREIGN PATENT DOCUMENTS

JP    2006-185745 A    7/2006
JP    2008-112334 A    5/2008
(Continued)

OTHER PUBLICATIONS

International Search Report for PCT/JP2011/005827 dated Dec. 27, 2011.

*Primary Examiner* — Allison Johnson
(74) *Attorney, Agent, or Firm* — Pearne & Gordon LLP

(57) ABSTRACT

A touch panel device includes: an electrostatic capacitance touch panel of mutual capacitance type which includes transmission-side electrodes and reception-side electrodes; a detecting unit which detects a contact with the electrostatic touch panel and outputs contact information; and a detection signal variation calculating unit which calculates and outputs detection signal variations of the transmission-side electrodes and the reception-side electrodes based on the contact information. The touch panel device further includes: a variation distribution calculating unit which calculates and outputs a variation distribution of the detection signals based on the detection signal variations; and a determining unit which determines that an object contacting the electrostatic touch panel is a drop of water when a peak value of the variation distribution of the detection signals is a predetermined negative threshold or less.

6 Claims, 8 Drawing Sheets

(56) References Cited

U.S. PATENT DOCUMENTS

2011/0084936 A1* 4/2011 Chang et al. .................. 345/174
2011/0241907 A1* 10/2011 Cordeiro ......................... 341/20
2012/0050214 A1* 3/2012 Kremin et al. ................ 345/174

FOREIGN PATENT DOCUMENTS

| JP | 2009-181232 A | 8/2009 |
| JP | 2009-238701 A | 10/2009 |

* cited by examiner

TOUCH PANEL DEVICE DETECTING WATER

TECHNICAL FIELD

The invention relates to an electrostatic capacitance type touch panel device of mutual capacitance type.

BACKGROUND ART

In recent years, a touch panel is widely used in a PDA (Personal Digital Assistant) and a mobile phone. Especially, a mobile phone with a waterproof touch panel attracts attentions. A touch panel device used in this kind of mobile phone is known, for example, in Patent Document 1 and Patent Document 2. An electrostatic capacitance type touch switch device described in Patent Document 1 includes: an operational circuit which measures the variations of the resistance values of resistive electrodes and the variations of the electrostatic capacitances of switch electrodes when a finger is pressed and is not pressed on a touch switch; and a nonvolatile memory which stores the variations of the resistance values and the electrostatic capacitances, thereby preventing a malfunction due to a drop of water. A touch switch detecting device described in the Patent Document 2 uses an electrostatic capacitance type touch switch of a self-capacitance type, and sets a detection threshold as a standard to determine the presence or absence of a user operation based on the number of contact electrodes which are determined to be touched by a finger.

RELATED ART DOCUMENTS

Patent Documents

Patent Document 1: JP-A-2006-185745
Patent Document 2: JP-A-2009-238701

SUMMARY OF THE INVENTION

Problem to be Solved by the Invention

In the electrostatic capacitance type touch switch device described in Patent Document 1, the malfunction due to the drop of water can be prevented. However, because the resistive electrodes are required for the resistance values to be read out, there is a problem that the structure becomes complicated.

In the touch switch detection device described in Patent Document 2, due to the characteristics of the electrostatic self-capacitance type touch switch, the variation distribution of the detection signals when a drop of water is detected shows positive distributions as well as the variation distribution of the detection signals when a finger or pen is detected. Therefore, the touch switch detection device can not distinguish whether an object contacting the surface of the touch panel is a drop of water or a pen resulting in small variation, and responds to the detection in error. Further, when a finger or a pen enters in a drop of water, the variation of the detection signals increases. Therefore, there is a problem that even if the finger or the pen does not directly touch the surface of the touch panel, the touch switch detection device responds to the touch through the drop of water.

The present invention is made in view of the above problems, and an object thereof is to provide a touch panel device which can prevent malfunctions due to a drop of water without complicating the structure.

Means for Solving the Problem

A touch panel device of the present invention includes: an electrostatic capacitance touch panel of mutual capacitance type which includes a plurality of transmission-side electrodes and a plurality of reception-side electrodes; a detecting unit which detects a contact with the electrostatic touch panel and outputs contact information; a detection signal variation calculating unit which calculates and outputs detection signal variations of the plurality of transmission-side electrodes and the plurality of reception-side electrodes based on the contact information; a variation distribution calculating unit which calculates and outputs a variation distribution of the detection signals based on the detection signal variations; and a determining unit which determines that an object contacting the electrostatic touch panel is a drop of water when a peak value of the variation distribution of the detection signals is a predetermined negative threshold or less.

According to the above structure, by using the electrostatic capacitance touch panel of mutual capacitance type, whether a drop of water and a finger or a pen can be determined simply by the electrostatic touch panel, and the structure is simplified in comparison with the conventional technique which uses resistive electrodes. Further, an object contacting the surface of the electrostatic touch panel is determined with the negative threshold and is determined to be a drop of water when the peak value of the variation distribution of the detection signals is the predetermined negative threshold or less, it can be determined easily whether the object contacting the surface of the touch panel is a finger or pen or a drop of water. Thus, malfunctions due to the drop of water can be prevented without complicating the structure.

A touch panel device of the present invention includes: an electrostatic capacitance touch panel of mutual capacitance type which includes a plurality of transmission-side electrodes and a plurality of reception-side electrodes; a detecting unit which detects a contact with the electrostatic touch panel and outputs contact information; a detection signal variation calculating unit which calculates and outputs detection signal variations of the plurality of transmission-side electrodes and the plurality of reception-side electrodes based on the contact information; a variation distribution calculating unit which calculates and outputs a variation distribution of the detection signals based on the detection signal variations; and a determining unit which determines that an object contacting the electrostatic touch panel is a drop of water when a peak value of the variation distribution of the detection signals is a predetermined negative threshold or less and when a peak value of the variation distribution of the detection signals in a peripheral area which is around an area on the electrostatic touch panel where the peak value of the variation distribution of the detection signals is the predetermined negative threshold or less is a predetermined positive threshold or more.

According to the above structure, in the determination as to whether the object contacting the electrostatic touch panel is a drop of water, in addition to the determination as to whether the peak value of the variation distribution of the detection signals is the predetermined negative threshold or less, it is determined whether the peak value of the variation distribution of the detection signals of the peripheral area which is around the area on the electrostatic touch panel where the peak value of the variation distribution of the detection signals is the predetermined negative threshold or less is the predetermined positive threshold or more. When there is a drop of water on the electrostatic touch panel, the variation distribution of the detection signal becomes "+→−→+". That is to say, the area where there is water corresponds to "−", and the area in the periphery thereof corresponds to "+". Therefore, if the peak value of the variation distribution of the detection signals is the predetermined negative threshold or less and if the peak value of the variation distribution of the detection signals of the peripheral area which is around the area on the electrostatic touch panel where the peak value of the variation distribution of the detection signals is the predetermined negative threshold or less is the predetermined positive threshold or more, the object contacting the electrostatic touch panel is probably a drop of water. Thus, it can be determined more precisely than the above-described invention whether a drop of water contacts the electrostatic touch panel.

A touch panel device of the present invention includes: an electrostatic capacitance touch panel of mutual capacitance type which includes a plurality of transmission-side electrodes and a plurality of reception-side electrodes; a detecting unit which detects a contact with the electrostatic touch panel and outputs contact information; a detection signal variation calculating unit which calculates and outputs detection signal variations of the plurality of transmission-side electrodes and the plurality of reception-side electrodes based on the contact information; a variation distribution calculating unit which calculates and outputs a variation distribution of the detection signals based on the detection signal variations; a storage unit which stores the variation distributions of the detection signals in a predetermined sampling period; and a determining unit which determines that an object contacting the electrostatic touch panel is a drop of water when a peak value of the variation distributions of the detection signals stored in the storage unit is a predetermined negative threshold or less and when a peak value of the variation distribution of the detection signals in a peripheral area which is around the area on the electrostatic touch panel where the peak value of the variation distributions of the detection signals is the predetermined negative threshold or less is a first predetermined positive threshold or more, and invalidates a coordinate value finally output even if the peak value of the variation distribution of the detection signals is a second predetermined positive threshold or more.

According to the above structure, the variation distributions of the detection signals in a predetermined sampling period are stored, and it is determined that the object contacting the electrostatic touch panel is a drop of water when the peak value of the stored variation distributions of the detection signals is the predetermined negative threshold or less and when the peak value of the variation distribution of the detection signals of the peripheral area which is around the area on the electrostatic touch panel where the peak value of the variation distributions of the detection signals is the predetermined negative threshold or less is the first predetermined positive threshold or more, and the coordinate value finally output is invalidated even if the peak value of the variation distribution of the detection signals is the second predetermined positive threshold or more. Therefore, even if a finger or pen enters in a drop of water contacting the electrostatic touch panel, the finger or pen can be prevented from being mistakenly determined. That is to say, when a finger or pen is in a drop of water, a big finger may be mistakenly determined. By determining whether there has been water in the place, the mistaken determination can be prevented. Even if the distribution of the variation of the detection signals has a high peak of "+" such that the positive peak value is the second predetermined positive threshold or more, the coordinate value that is finally output is invalidated.

In the above structure, when the variation distribution of the detection signals at a coordinate point where there was a drop of water in the past becomes zero, the storage unit resets the stored past variations at the coordinate point.

According to the above structure, although there was a drop of water in the past, regular operations can be made by resetting the stored contents of the storage unit as that the water disappears now.

In the above structure, when the determining unit determines that the object contacting the electrostatic touch panel is a drop of water, an indication that there is a drop of water on the electrostatic touch panel is displayed.

According to the above structure, a user can be notified that there is a drop of water on the electrostatic touch panel.

Advantages of the Invention

According to the present invention, in the electrostatic capacitance touch panel of mutual capacitance type which has a plurality of transmission-side electrodes and a plurality of reception-side electrodes, malfunctions due to a drop of water can be prevented without complicating the structure.

MODE FOR CARRYING OUT THE INVENTION

Next, preferred embodiments for carrying out the invention will be explained in detail with reference to the accompanying drawings.

Embodiment 1

Figure 1:
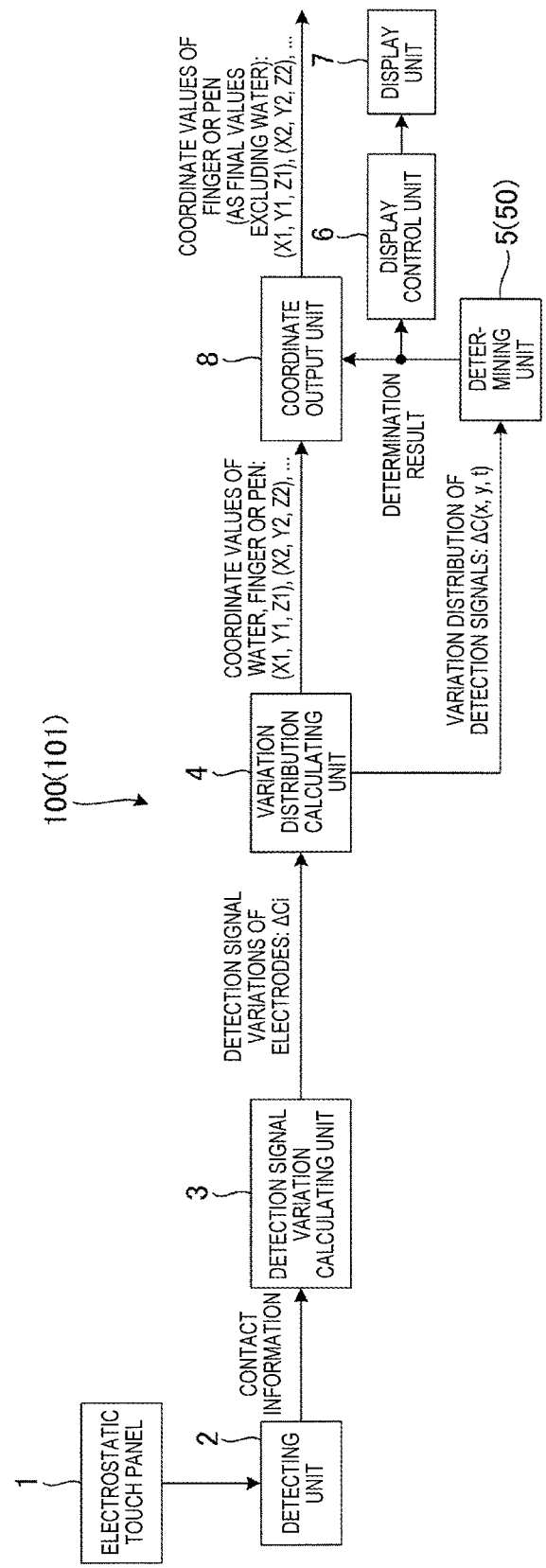
FIG. 1 is a block diagram which schematically shows a structure of a touch panel device according to an embodiment 1 of the invention.
Figure 2:
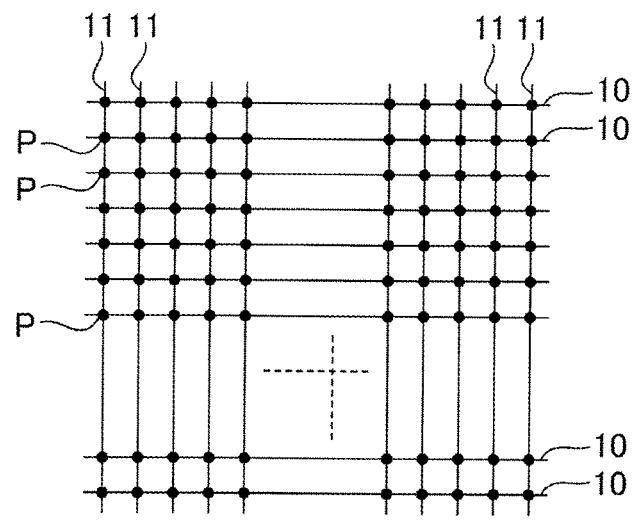
FIG. 2 schematically shows a structure of an electrostatic touch panel of the touch panel device according to the embodiment 1.

FIG. 1 is a block diagram which schematically shows a structure of a touch panel device according to an embodiment 1 of the invention. In FIG. 1, a touch panel device 100 of the embodiment includes an electrostatic touch panel 1, a detecting unit 2, a detection signal variation calculating unit 3, a variation distribution calculating unit 4, a determining unit 5, a display control unit 6, a display unit 7 and a coordinate output unit 8. FIG. 2 schematically shows a structure of the electrostatic touch panel 1. In FIG. 2, the electrostatic touch panel 1 is an electrostatic capacitance touch panel of mutual capacitance type which has a plurality of transmission-side electrodes 10 and a plurality of reception-side electrodes 11, and the plurality of transmission-side electrodes 10 and the plurality of reception-side electrodes 11 are arranged to intersect each other on the surface of a backing sheet which is not shown in the drawing.

Returning back to FIG. 1, the detecting unit 2 detects a contact with the electrostatic touch panel 1 from detection signals at the intersection points P (refer to FIG. 2) of the plurality of transmission-side electrodes 10 and the plurality of reception-side electrodes 11 of the electrostatic touch panel 1, and outputs contact information. Herein, the intersection points P of the transmission-side electrodes 10 and the reception-side electrodes 11 are referred to as electrodes. The detection signal variation calculating unit 3 measures the detection signals of the electrodes (that is, each of the detection signals of the plurality of transmission-side electrodes 10 and the plurality of reception-side electrodes 11 is measured) based on the contact information output from the detecting unit 2, calculates and outputs detection signal variations $\Delta Ci$. The variation of the detection signal is a different value due to the difference of the material which contacts the electrostatic touch panel 1.

Typically, the detection signal variation of the electrostatic capacitance touch panel of mutual capacitance type is output as a value which varies between a positive value and a negative value and around the value 0. In the case of water, the detection signal variation is assumed as a negative value. As the size of the water becomes larger, the negative value gradually increases. On the other hand, in the case of a finger or a pen, the detection signal variation is assumed as a positive value. As the size of the finger or the pen becomes larger, the positive value gradually increases. Particularly, the finger has a larger detection signal variation than the pen.

Figure 3:
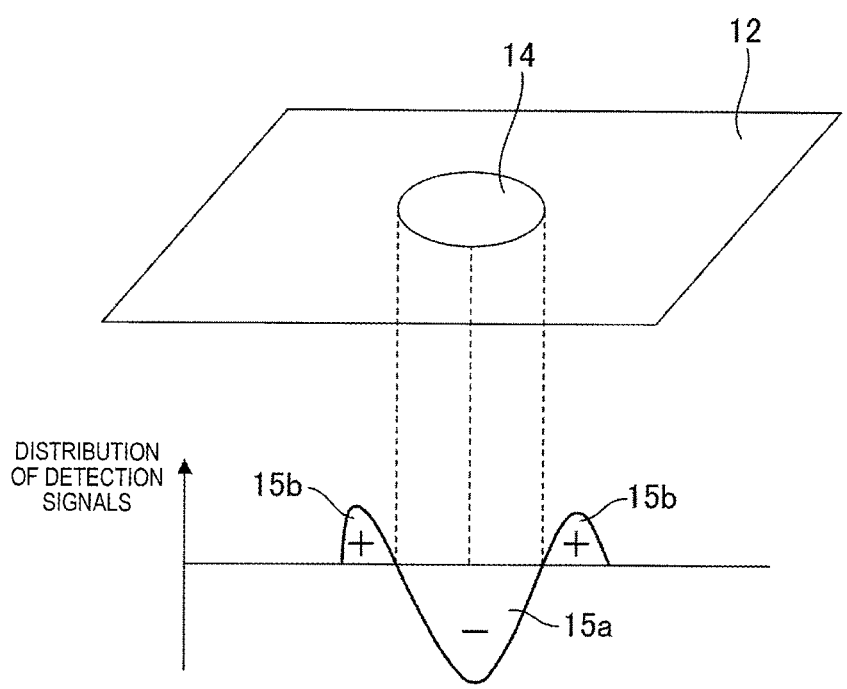
FIG. 3 schematically shows a distribution of detection signals when there is a drop of water on the electrostatic touch panel of the touch panel device according to the embodiment 1.

Returning back to FIG. 1, the variation distribution calculating unit 4 calculates and outputs a variation distribution $\Delta C (x, y, t)$ of the detection signals based on the detection signal variations $\Delta Ci$ of the electrodes calculated by the detection signal variation calculating unit 3. For the electrostatic capacitance touch panel 1 of mutual capacitance type, when there is water on the touch panel, the variation distribution of the detection signals becomes "+→−→+". FIG. 3 schematically shows a distribution of detection signals when there is a drop of water on the electrostatic touch panel 1. As shown in FIG. 3, a distribution 15a of the detection signals of a drop of water 14 is on the negative side, and a distribution 15b of the detection signals of those positions around the drop of water 14 is on the positive side. When there is the drop of water 14 on the electrostatic touch panel 1, the variation distribution of the detection signals becomes "+→−→+".

Figure 4:
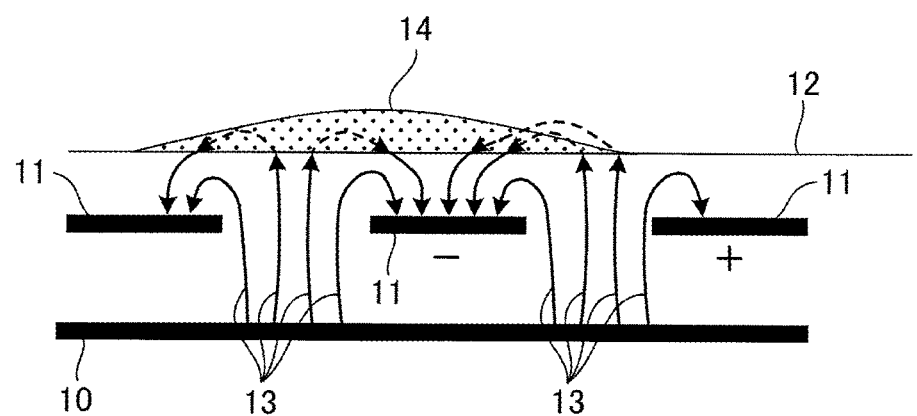
FIG. 4 shows a change of lines of electric force between transmission-side electrodes and reception-side electrodes when a drop of water contacts the electrostatic touch panel of the touch panel device according to the embodiment 1.

FIG. 4 shows the change of the lines of electric force between the transmission-side electrodes 10 and the reception-side electrodes 11 when the drop of water 14 contacts the electrostatic touch panel 1. In FIG. 4, in the electrostatic touch panel 1, lines of electric force 13 occur from the transmission-side electrodes 10 to the reception-side electrodes 11, but when the drop of water 14 touches a touch surface 12, because the drop of water 14 works as a dielectric, the charge amount increases and the lines of electric force 13 are absorbed inwards. Thus, the distribution at the drop of water 14 is on the negative side, and the distribution around the drop of water 14 is on the positive side. That is to say, it is considered that the variation distribution of the detection signals of the drop of water 14 {"+"→"−"→"+"} is produced for the above-described two reasons. However, when a finger (pen) touches the drop of water 14, because the finger is grounded through the human body, the drop of water 14 and the finger are treated as one finger.

Returning back to FIG. 1, the determining unit 5 determines whether the peak value of variation distribution $\Delta C (x, y, t)$ of the detection signals calculated by the variation distribution calculating unit 4 is a predetermined negative threshold or less and outputs the result. When the peak value of the variation distribution $\Delta C (x, y, t)$ of the detection signals is the predetermined negative threshold or less, the determining unit 5 determines that the object contacting the electrostatic touch panel 1 is water.

When the determination result of the determining unit 5 is water, the display control unit 6 performs a display on the display unit 7 to inform the user that water contacts the electrostatic touch panel 1. For example, a message "please wipe the touch panel" is displayed. It is possible to display positions on the display unit 7 corresponding to the positions where the water contacts, for example, in light blue, by obtaining the coordinate values of the positions where the water contacts. In this way, the positions where the water contacts can be recognized at first sight.

The variation distribution calculating unit 4 not only calculates the variation distribution of the detection signals of the electrodes, but also calculates and outputs coordinate values (X1, Y1, Z1), (X2, Y2, Z2), . . . of the positions where the electrostatic touch panel 1 is contacted. The coordinate output unit 8 outputs the coordinate values (X1, Y1, Z1), (X2, Y2, Z2), . . . of the finger or the pen as the final values by removing the coordinate values of the water from the coordinate values (X1, Y1, Z1), (X2, Y2, Z2), . . . of the positions where the electrostatic touch panel 1 is contacted which are calculated by the variation distribution calculating unit 4.

Figure 5:
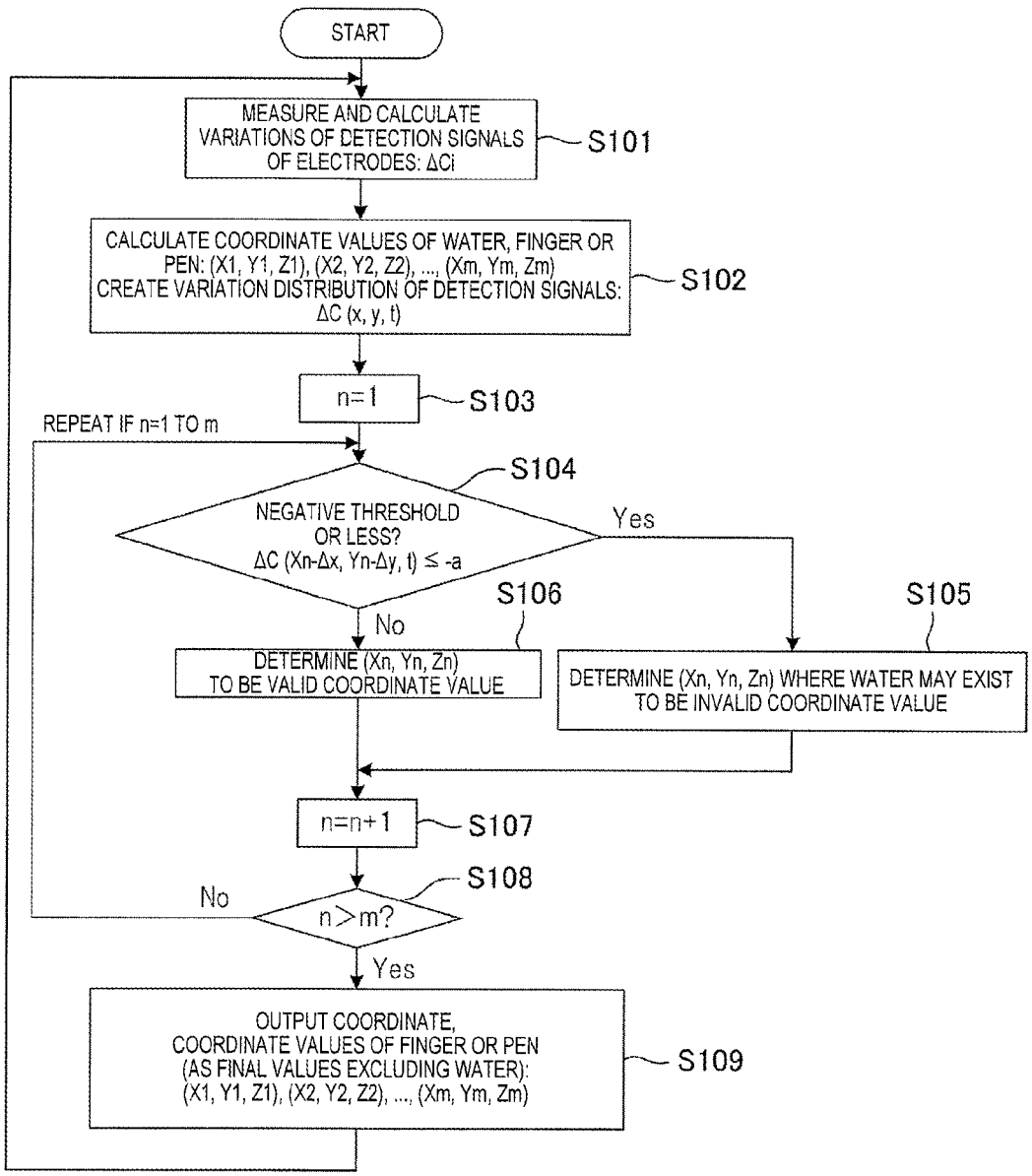
FIG. 5 is a flow chart which describes operations of the touch panel device according to the embodiment 1.

Then, operations of the touch panel device 100 of the present embodiment are described. FIG. 5 is a flow chart to describe the operations of the touch panel device 100 of the present embodiment. In FIG. 5, the detection signal variation calculating unit 3 measures the detection signals of the electrodes of the electrostatic touch panel 1, and calculates the variation (step S101). Then, the variation distribution calculating unit 4 calculates the coordinate values (X1, Y1, Z1), (X2, Y2, Z2), . . . , (Xm, Ym, Zm) of the water, the finger or the pen, and then prepares the variation distribution $\Delta C (x, y, t)$ of the detection signals (step S102). Then, the determining unit 5 sets a counter n to compare the variation distribution $\Delta C (x, y, t)$ of the detection signals of all the electrodes with a negative threshold (−a: a is a positive real number) (step S103). In this case, at the beginning the value of the counter n is set as "1". The counter n is assumed as a value from 1 to m.

The determining unit 5 determines whether the variation distribution $\Delta C (X1-\Delta x, Y1-\Delta y, t)$ of the detection signals is the negative threshold (−a) or less (step S104). That is to say, it is determined whether $\Delta C (X1-\Delta x, Y1-\Delta y, t) \leq -a$. When it is determined that $\Delta C (X1-\Delta x, Y1-\Delta y, t) \leq -a$, (X1, Y1, Z1) is regarded as an invalid coordinate value since there may be water at the coordinate point (step S105). In contrast, when it is determined that $\Delta C (X1-\Delta x, Y1-\Delta y, t) > -a$, (X1, Y1, Z1) is regarded as a valid coordinate value since there is no water at the coordinate point (step S106).

Figure 6:
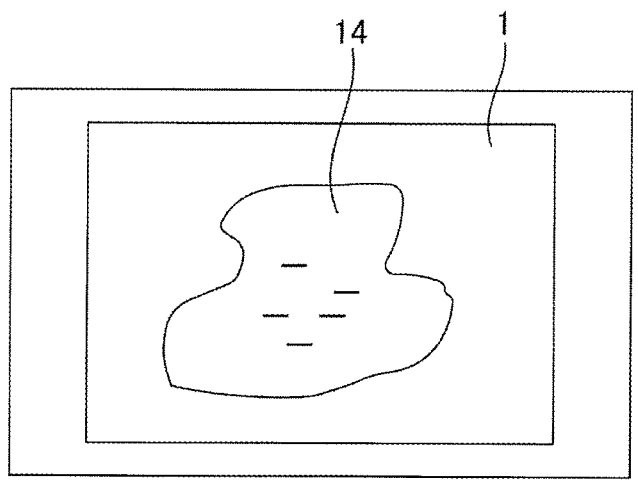
FIG. 6 shows that a drop of water contacts the top surface of the electrostatic touch panel of the touch panel device according to the embodiment 1.

In the step S104, an object contacting the top surface of the electrostatic touch panel 1 is determined with the negative threshold (−a). If the peak value of the variation distribution of the detection signals is the negative threshold (−a) or less, the object is determined to be water and ignored. FIG. 6 shows that the drop of water 14 contacts the top surface of the electrostatic touch panel 1. The area where the drop of water 14 contacts the electrostatic touch panel 1 is an area the negative threshold (−a) or less and is ignored as water.

Returning back to FIG. 5, after the step S105 or the step S106 has been performed, the determining unit 5 counts up the value of the counter n to n+1=2 (step S107). Then, it is determined whether the value of the counter n (=2) exceeds m (step S108). The flow returns to the step S104 when the values of the counter n is m or less, and the determining unit 5 determines whether the variation distribution ΔC (X2−Δx, Y2−Δy, t) of the next detection signals is the negative threshold (−a) or less. When it is determined that ΔC (X2−Δx, Y2−Δy, t)≤−a, (X2, Y2, Z2) is regarded as an invalid coordinate value since there may be water at the coordinate point (step S105).

In contrast, when it is determined that ΔC (X2−Δx, Y2−Δy, t)>−a, (X2, Y2, Z2) is regarded as a valid coordinate value since there is no water at the coordinate point (step S106). After the step S105 or the step S106 has been performed, the determining unit 5 counts up the value of the counter n to n+1=2 (step S107). Then, it is determined whether the value of the counter n exceeds m (step S108). The flow returns to the step S104 when the values of the counter n (=3) is m or less, and the determining unit 5 determines whether the variation distribution ΔC (X3−Δx, Y3−Δy, t) of the next detection signals is the negative threshold (−a) or less. Then, the processes of the step S104 to the step S108 are performed like the above until the value of the counter n becomes m.

After the processes of the step S104 to the step S108 are performed until the value of the counter n becomes m, the determining unit 5 outputs a determining result (step S109). Because the determining result is output from determining unit 5, the coordinate output unit 8 outputs coordinates. In this case, the coordinate values (X1, Y1, Z1), (X2, Y2, Z2), . . . , (Xm, Ym, Zm) of the finger or the pen are output as the final values in which the coordinate values of the water are removed. After the process of the step S109 is finished, the flow returns to the step S101, and the processes like the above are performed.

According to the touch panel device 100 of the present embodiment, because the electrostatic capacitance touch panel 1 of mutual capacitance type is used, water and a finger or a pen can be determined simply by the electrostatic touch panel, and the structure is simplified in comparison with the conventional technique which uses resistive electrodes. Further, because an object contacting the surface of the electrostatic touch panel 1 is determined with the negative threshold (−a), and is determined to be water when the peak value of the variation distribution of the detection signals is the negative threshold (−a) or less, it can be easily determined whether the object contacting the surface of the electrostatic touch panel 1 is a finger or pen or water. That is, according to the touch panel device 100 of the present embodiment, malfunctions due to a drop of water can be prevented without complicating the structure.

Embodiment 2

In the touch panel device 100 of the above-described embodiment 1, if the peak value of the variation distribution of the detection signals is the negative threshold (−a) or less, the object contacting the electrostatic touch panel 1 is determined to be water and ignored. In the touch panel device of the embodiment 2, besides the above, if the peak value of the variation distribution of the detection signals of the peripheral area which is around the negative area is a positive threshold (b: b is a positive real number) or more, the object is determined to be water and ignored. That is to say, in the touch panel device of the embodiment 2, when the peak value of the variation distribution of the detection signals is the negative threshold (−a) or less, and the peak value of the variation distribution of the detection signals of the peripheral area which is around the area on the electrostatic touch panel 1 where the peak value of the variation distribution of the detection signals is the negative threshold (−a) or less is the positive threshold (b) or more, the object contacting the electrostatic touch panel 1 is determined to be water and ignored.

The structure of the touch panel device of the embodiment 2 is the same as the structure of the touch panel device 100 of the embodiment 1 (shown in FIG. 1) except that a new function is added to the determining unit 5 of the touch panel device 100 of the embodiment 1. Therefore, FIG. 1 is also used to show the touch panel device of the embodiment 2. However, a symbol 101 is given to the touch panel device of the embodiment 2 and a symbol 50 is given to the determining unit.

Figure 7:
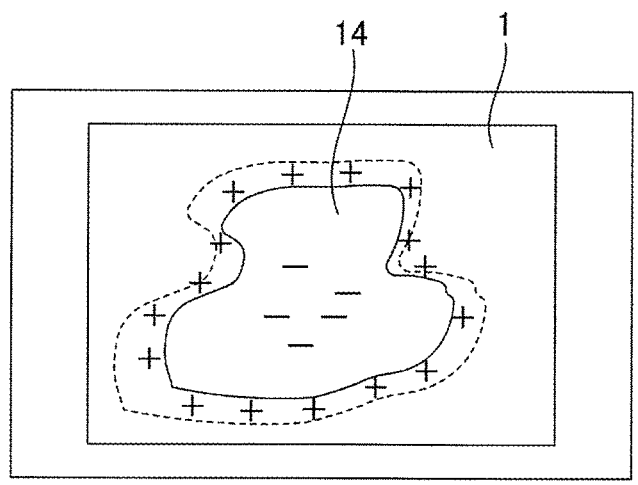
FIG. 7 shows that a drop of water contacts the top surface of an electrostatic touch panel of a touch panel device according to an embodiment 2 of the invention.

FIG. 7 shows that the drop of water 14 contacts the top surface of the electrostatic touch panel 1. The area where the drop of water 14 contacts the electrostatic touch panel 101 is an area equal to or less than the negative threshold (−a) and the area around the drop of water 14 is an area equal to or more than the positive threshold (b). In the touch panel device 101 of the embodiment 2, if the peak value of the variation distribution of the detection signals as described above is the negative threshold (−a) or less, and the peak value of the variation distribution of the peripheral detection signals is the positive threshold (b) or more, the object is determined to be water and ignored.

Figure 8:
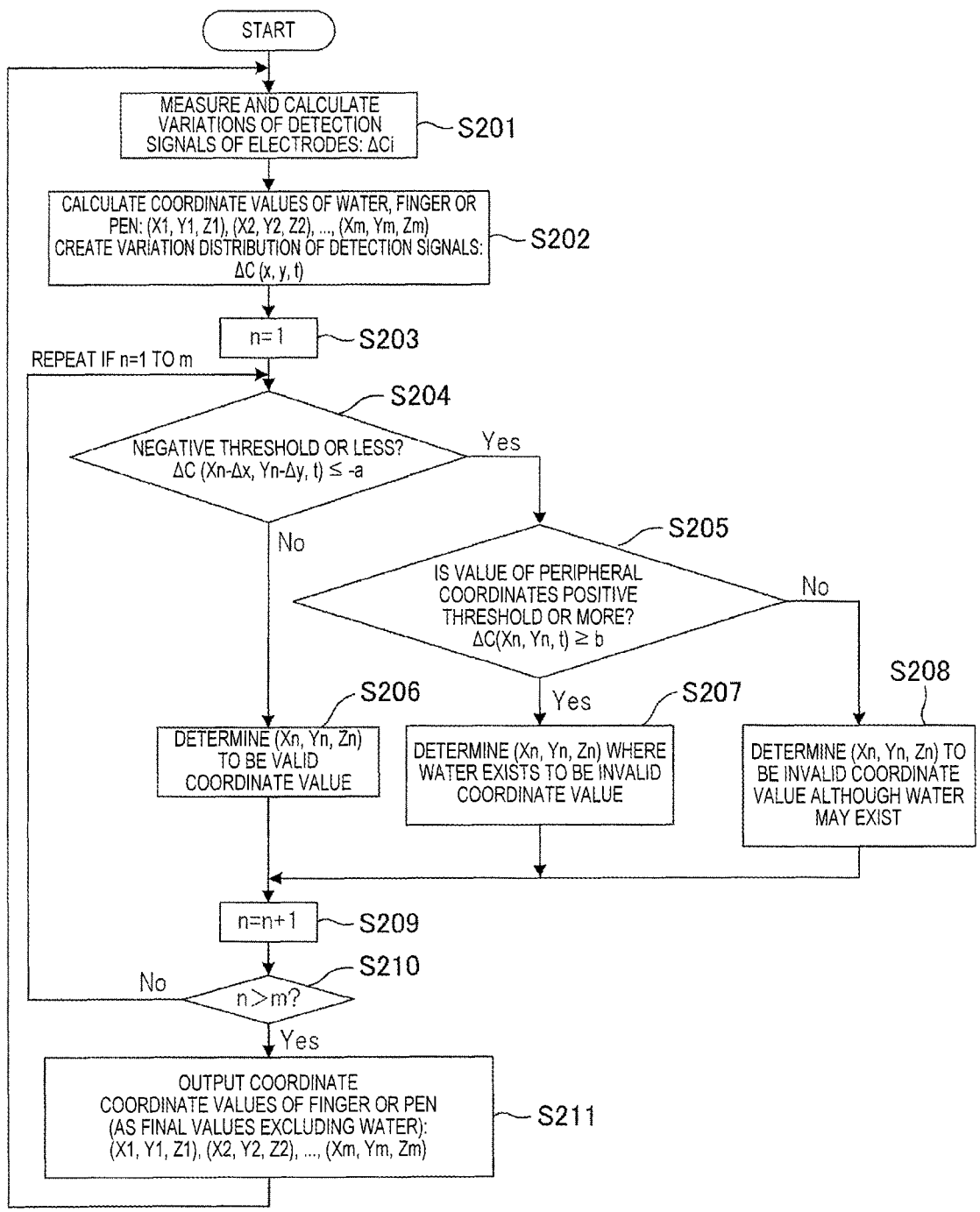
FIG. 8 is a flow chart which describes operations of the touch panel device according to the embodiment 2.

FIG. 8 is a flow chart to describe operations of the touch panel device 101 of the present embodiment. In FIG. 8, since the step S201 to the step S204 are the same as the step S101 to the step S104 of FIG. 5, the step S206 is the same as the step S106 of FIG. 5, and the step S209 to the step S211 are the same as the step S107-step S109 of FIG. 5, their description are omitted. Therefore, only the processes when it is determined in the step S204 that the variation distribution ΔC (X1−Δx, Y1−Δy, t) of the detection signals is the negative threshold (−a) or less, that is, the processes of step S205, step S207 and step S208 are described.

When the variation distribution ΔC (X1−Δx, Y1−Δy, t) of the detection signals is the negative threshold (−a) or less or when ΔC (X1−Δx, Y1−Δy, t)≤−a, the determining unit 50 determines whether the value of the peripheral coordinates of the coordinates equal to or less than the negative threshold (−a) is the positive threshold (b) or more. That is to say, it is determined whether ΔC (X1, Y1, t)≥b. When it is determined that ΔC (X1, Y1, t)≥b, (X1, Y1, Z1) is regarded as an invalid coordinate value since there is a drop of water at the coordinate point (step S207). In contrast, when ΔC (X1, Y1, t)<b, (X1, Y1, Z1) is regarded as an invalid coordinate value since there may be a drop of water at the coordinate point (step S208). After the step S207 or the step S208 has been performed, the flow advances to a step S209 in which the determining unit 50 adds [1] to the value of the counter n, and the same processes are repeated until the value of the counter n becomes [m].

According to the touch panel device 101 of the present embodiment, when the determining unit 50 determines whether an object contacting the electrostatic touch panel 1 is water, in addition to determining whether the peak value of the variation distribution of the detection signals is the negative threshold (−a) or less, it is determined whether the peak value of the variation distribution of the detection signals of the peripheral area which is around the area of the electrostatic touch panel 1 where the peak value of the variation distribution of the detection signals is the negative threshold (−a) or less is the positive threshold (b) or more, and if the peak value is the positive threshold (b) or more, the object contacting the electrostatic touch panel 1 is determined to be water. The contact of the electrostatic touch panel 1 and water can be determined more precisely than the touch panel device 100 of the embodiment 1.

Embodiment 3

Next, a touch panel device according to the embodiment 3 of the invention is described. In the touch panel device 101 of the above-described embodiment 2, if the peak value of the variation distribution of the detection signals is the negative threshold (−a) or less, and the peak value of the variation distribution of the detection signals around the negative area is the positive threshold (b) or more, the object is determined to be water and ignored. But the touch panel device of the present embodiment stores the variation distributions of detection signals in a predetermined sampling period. When the peak value of the variation distributions of the detection signals before the predetermined sampling period or in a certain period of time in the past is the negative threshold (−a) or less, and the peak value of the variation distribution of the detection signals in the peripheral area which is around the area of the electrostatic touch panel 1 where the peak value of the variation distribution of the detection signals is the negative threshold (−a) or less is a positive threshold (b: a first predetermined positive threshold) or more, the object contacting the electrostatic touch panel 1 is determined to be water. Even if the peak value of the variation distribution of the detection signals is equal to or larger than a large positive threshold (a value more than the first predetermined positive threshold: a second predetermined positive threshold) whose value is larger than the positive threshold (b), the coordinate value that is finally output is invalidated.

Thus, in the touch panel device of the present embodiment, because the presence or absence of water in the electrostatic touch panel 1 is determined using the variation distributions of the detection signals in the past, it can be examined whether there was water in the past. The reason for the above is, when a finger or a pen is in water, the water and the finger or the water and the pen are put together, and a big finger may be mistakenly determined. By examining whether there was water in the place in the past, even if there is water, a finger can be prevented from being mistakenly determined.

Figure 9:
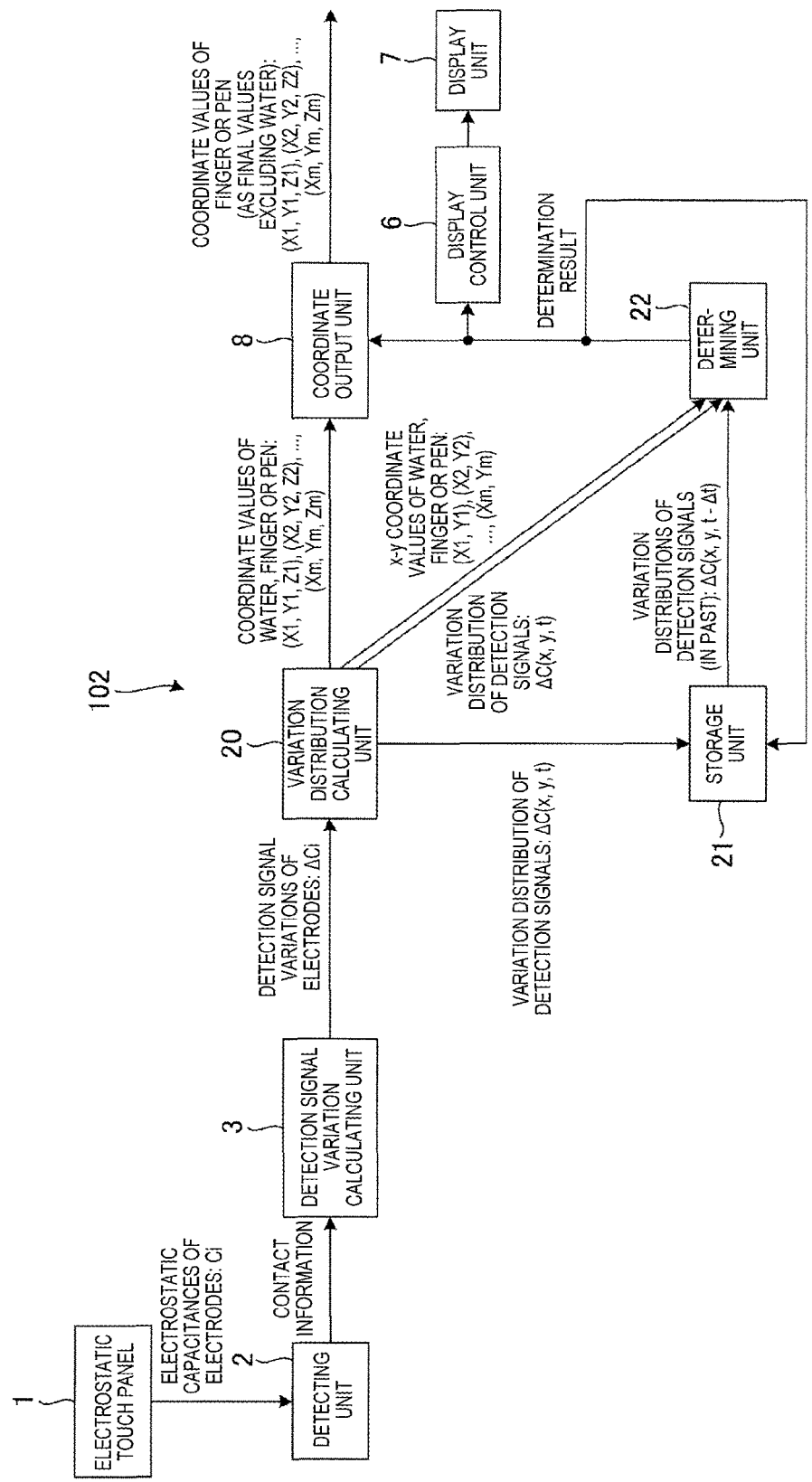
FIG. 9 is a block diagram which schematically shows a structure of a touch panel device according to an embodiment 3 of the invention.

FIG. 9 is a block diagram which schematically shows a structure of a touch panel device according to the embodiment 3 of the invention. In FIG. 9, a touch panel device 102 of the embodiment includes an electrostatic touch panel 1, a detecting unit 2, a detection signal variation calculating unit 3, a variation distribution calculating unit 20, a storage unit 21, a determining unit 22, a display control unit 6, a display unit 7 and a coordinate output unit 8.

The variation distribution calculating unit 20 calculates and outputs a variation distribution $\Delta C\,(x, y, t)$ of the detection signals based on the detection signal variations $\Delta C_i$ of the electrodes calculated by the detection signal variation calculating unit 3. Further, the variation distribution calculating unit 20 calculates x, y coordinate values (X1, Y1), (X2, Y2), . . . , (Xm, Ym) of water, a finger or a pen, and outputs to the determining unit 22. Further, the variation distribution calculating unit 20 calculates and outputs coordinate values (X1, Y1, Z1), (X2, Y2, Z2), . . . of the positions where the electrostatic touch panel 1 is contacted. The coordinate output unit 8 outputs the coordinate values (X1, Y1, Z1), (X2, Y2, Z2), . . . of the finger or the pen as the final values by removing the coordinate values of the drop of water from the coordinate values (X1, Y1, Z1), (X2, Y2, Z2), . . . of the positions where the electrostatic touch panel 1 is contacted which are calculated by the variation distribution calculating unit 20.

The storage unit 21 stores the variation distributions of the detection signals in a predetermined sampling period. For example, a flash memory which can re-write data is suitable for the storage unit 21. When the peak value of the variation distributions of the detection signals stored in the storage unit 21 is the negative threshold (−a) or less, and the peak value of the variation distribution of the detection signals in the peripheral area which is around the area of the electrostatic touch panel 1 where the peak value of the variation distribution of the detection signals is the negative threshold (−a) or less is the first predetermined positive threshold or more, the determining unit 22 determines that that the object contacting the electrostatic touch panel 1 is water. Even if the peak value of the variation distribution of the detection signals is the second predetermined positive threshold or more, the coordinate value that is finally output is invalidated.

When the determination result of the determining unit 22 is water, the display control unit 6 performs a display on the display unit 7 to inform the user that water contacts the electrostatic touch panel 1. For example, a message "water is attached to the touch panel" is displayed. It is possible to display positions on the display unit 7 corresponding to the positions where the water contacts in light blue by obtaining the coordinate values of the positions where the water contacts. In this way, the positions where the water contacts the electrostatic touch panel 1 can be recognized at first sight. The coordinate output unit 8 outputs the coordinate values (X1, Y1, Z1), (X2, Y2, Z2), . . . of the finger or the pen as the final values by removing the coordinate values of the water from the coordinate values (X1, Y1, Z1), (X2, Y2, Z2), . . . of the positions where the electrostatic touch panel 1 is contacted which are calculated by the variation distribution calculating unit 20.

Figure 10:
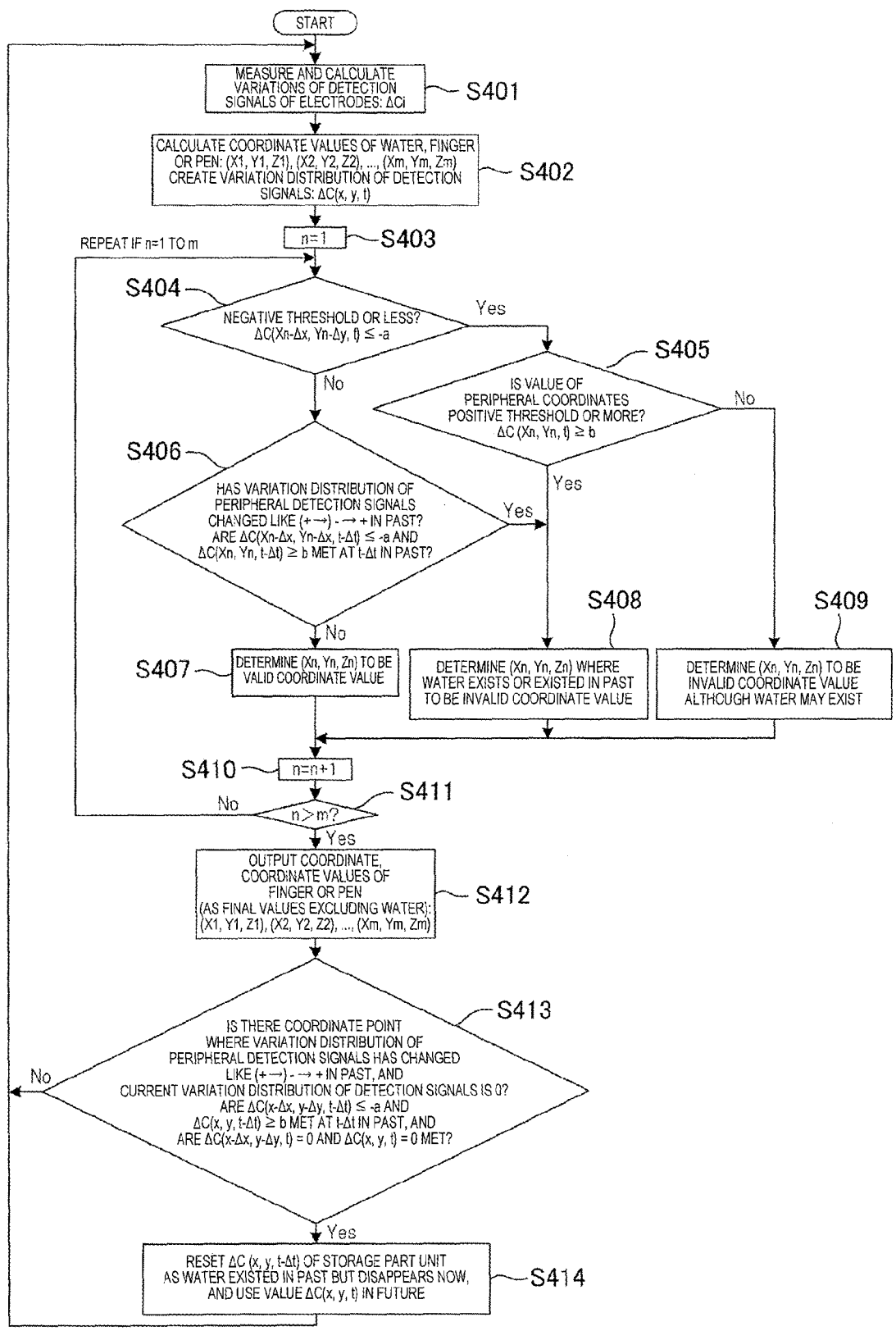
FIG. 10 is a flow chart which describes operations of the touch panel device according to the embodiment 3.

FIG. 10 is a flow chart to describe operations of the touch panel device 102 of the present embodiment. In FIG. 10, since the step S401 to the step S404 are the same as the step S101 to the step S104 of FIG. 5, the step S407 is the same as the step S106 of FIG. 5, and the step S410 to the step S412 are the same as the step S107-step S109 of FIG. 5, their description are omitted. Therefore, only the processes when it is determined in the step S404 that the variation distribution $\Delta C$ (X1−$\Delta$x, Y1−$\Delta$y, t) of the detection signals is the negative threshold (−a: a is a positive real number) or less, that is, the processes of step S405, step S408 and step S409, the processes when the variation distribution $\Delta C$ (X1−$\Delta$x, Y1−$\Delta$y, t) of the detection signals exceeds the negative threshold (−a), that is, the process of step S406, and the processes after step S412, that is, the processes of step S413 and step S414 are described.

When it is determined that the variation distribution $\Delta C$ (X1−$\Delta$x, Y1−$\Delta$y, t) of the detection signals is the negative threshold (−a) or less or when it is determined that $\Delta C$ (X1−$\Delta$x, Y1−$\Delta$y, t)≤−a, the determining unit 22 determines whether the value of the peripheral coordinates of the coordinates equal to or less than the negative threshold (−a) is the positive threshold (b) or more. That is to say, it is determined whether $\Delta C$ (X1,Y1, t)≥b. When it is determined that $\Delta C$ (X1, Y1, t)≥b, (X1, Y1, Z1) is regarded as an invalid coordinate value since there is water at the coordinate point or there was water in the past (step S408). In contrast, when ΔC (X1, Y1, t)<b, (X1, Y1, Z1) is regarded as an invalid coordinate value since there may be water at the coordinate point (step S409).

Herein, the processes along the course of step S404→step S405→step S408 are equivalent to the following processes: "when the peak value of the variation distributions of the detection signals is the negative threshold (−a) or less, and the peak value of the variation distribution of the detection signals in the peripheral area which is around the area of the electrostatic touch panel 1 where the peak value of the variation distribution of the detection signals is the negative threshold (−a) or less is a positive threshold (b: a first predetermined positive threshold) or more, the object contacting the electrostatic touch panel 1 is determined to be water, and even if the peak value of the variation distribution of the detection signals is equal to or larger than a large positive threshold (a value more than the first predetermined positive threshold: a predetermined positive threshold) whose value is larger than the positive threshold (b), the coordinate value that is finally output is invalidated."

After the step S408 or the step S409 has been performed, the flow advances to the step S410, and the determining unit 22 adds [1] to the value of the counter n.

On the other hand, when it is determined that the variation distribution ΔC (X1−Δx, Y1−Δy, t) of the detection signals exceeds the negative threshold (−a), that is, when it is determined that ΔC (X1−Δx, Y1−Δy, t)>a, the determining unit 22 determines whether the variation distribution of the peripheral detection signals has changed like {"+"→"−"→"+"} in the past (step S406). That is to say, it is determined whether ΔC (X1−Δx, Y1−Δy, t−Δt)≤−a and ΔC (X1, Y1, t−Δt)≥b are met at t−Δt in the past. When the conditions are met, the flow advances to step S408. On the other hand, when the conditions are not met, the flow advances to step S410 and the value of the counter n is added by "1".

After the processes of the step S404 to the step S411 are performed until the value of the counter n becomes m, the determining unit 22 outputs a determining result (step S412). Because the determining result is output from determining unit 22, the coordinate output unit 8 outputs coordinates. In this case, the coordinate values (X1, Y1, Z1), (X2, Y2, Z2), . . . , (Xm, Ym, Zm) of the finger or the pen are output as the final values in which the coordinate values of the water are removed. After the process of the step S412 is finished, the flow advances to a step S413. In the step S413, it is determined whether there is a coordinate point where the variation distribution of the peripheral detection signals has changed like {"+"→"−"→"+"} in the past, and the current variation distribution of the detection signals is "0". That is to say, it is determined whether ΔC (x−Δx, y−Δy, t−Δt)≤−a and ΔC (x, y, t−Δt)≥b are met at t−Δt in the past, and ΔC (x−Δx, y−Δy, t)=0 and ΔC (x, y, t)=0 are met. When these conditions are not met, the flow returns to the step S401, and when these conditions are met, although there was water in the past, the water disappears now. The ΔC (x, y, t−Δt) of the storage unit 21 is reset, and the value ΔC (x, y, t) afterwards is used in the future (step S414). After the process of the step S414 is finished, the flow returns to the step S401. Although there was water in the past, regular operations can be made by resetting the stored contents of the storage unit 21 as that the water disappears now.

According to the touch panel device 102 of the present embodiment, the variation distributions of the detection signals in a predetermined sampling period are stored. When the peak value of the variation distributions of the detection signals is the negative threshold (−a) or less, and the peak value of the variation distribution of the detection signals in the peripheral area around the area of the electrostatic touch panel 1 where the peak value of the variation distribution of the detection signals is the negative threshold (−a) or less is the positive threshold (b: the first predetermined positive threshold) or more, the object contacting the electrostatic touch panel 1 is determined to be water. Even if the peak value of the variation distribution of the detection signals is equal to or larger than a positive threshold (a value more than the first predetermined positive threshold) whose value is larger than the positive threshold (b), the coordinate value which is finally output is determined to be invalid. Therefore, even if a finger or a pen is in water contacting the electrostatic touch panel 1, the finger or the pen can be prevented from being mistakenly determined. That is to say, when a finger or a pen is in water, a big finger may be mistakenly determined. By examining whether there was water in the place in the past, the mistaken determination can be prevented. Even if the distribution of the variation of the detection signals has a high peak of "+" such that the positive peak value is the second predetermined positive threshold or more, the coordinate value that is finally output is invalidated.

Because when the variation distribution at a coordinate point where there was a drop of water in the past becomes zero, the storage unit 21 resets the stored past variations at the coordinate point, regular operations can be made.

Although the present invention is described in detail with reference to specific embodiments, it is apparent to a skilled person in the art that various modifications and changes may be made without departing from the spirit and scope of the invention.

This application is based on the Japanese patent application (Application No. 2010-234492) filed on Oct. 19, 2010, contents of which are incorporated herein by reference.

INDUSTRIAL APPLICABILITY

The present invention has an effect that malfunctions due to a drop of water can be prevented without complicating the structure, and it is possible to apply the invention to electronic devices using a touch panel such as a PDA or a mobile phone.

DESCRIPTION OF REFERENCE SIGNS

1: Electrostatic Touch Panel
2: Detecting Unit
3: Detection Signal Variation Calculating Unit
4, 20: Variation Distribution Calculating Unit
5, 22, 50: Determining Unit
6: Display Control Unit
7: Display Unit
8: Coordinate Output Unit
10: Transmission-Side Electrode
11: Reception-Side Electrode
12: Touch Surface
13: Line Of Electric Force
14: Drop Of Water
21: Storage Unit
100, 101, 102: Touch Panel Device

The invention claimed is:

1. A touch panel device comprising:
an electrostatic capacitance touch panel of mutual capacitance type which comprises a plurality of transmission-side electrodes and a plurality of reception-side electrodes;
a detecting unit which detects a contact with the electrostatic touch panel and outputs contact information;

a detection signal variation calculating unit which calculates and outputs detection signal variations of the plurality of transmission-side electrodes and the plurality of reception-side electrodes based on the contact information;

a variation distribution calculating unit which calculates and outputs a variation distribution of the detection signals based on the detection signal variations; and a determining unit which determines that an object contacting the electrostatic touch panel is a drop of water when a peak value of the variation distribution of the detection signals is a predetermined negative threshold or less and when a peak value of the variation distribution of the detection signals in a peripheral area which is around an area on the electrostatic touch panel where the peak value of the variation distribution of the detection signals is the predetermined negative threshold or less is a predetermined positive threshold or more.

2. The touch panel device according to claim 1, wherein when the determining unit determines that the object contacting the electrostatic touch panel is a drop of water, an indication that there is a drop of water on the electrostatic touch panel is displayed.

3. A touch panel device comprising:

an electrostatic capacitance touch panel of mutual capacitance type which comprises a plurality of transmission-side electrodes and a plurality of reception-side electrodes;

a detecting unit which detects a contact with the electrostatic touch panel and outputs contact information;

a detection signal variation calculating unit which calculates and outputs detection signal variations of the plurality of transmission-side electrodes and the plurality of reception-side electrodes based on the contact information;

a variation distribution calculating unit which calculates and outputs a variation distribution of the detection signals based on the detection signal variations;

a storage unit which stores the variation distributions of the detection signals in a predetermined sampling period; and a determining unit which determines that an object contacting the electrostatic touch panel is a drop of water when a peak value of the variation distributions of the detection signals stored in the storage unit is a predetermined negative threshold or less and when a peak value of the variation distribution of the detection signals in a peripheral area which is around the area on the electrostatic touch panel where the peak value of the variation distributions of the detection signals is the predetermined negative threshold or less is a first predetermined positive threshold or more, and invalidates a coordinate value finally output even if the peak value of the variation distribution of the detection signals is a second predetermined positive threshold or more.

4. The touch panel device according to claim 3, wherein when the variation distribution of the detection signals at a coordinate point where there was a drop of water in the past becomes zero, the storage unit resets the stored past variations at the coordinate point.

5. The touch panel device according to claim 4, wherein when the determining unit determines that the object contacting the electrostatic touch panel is a drop of water, an indication that there is a drop of water on the electrostatic touch panel is displayed.

6. The touch panel device according to claim 3, wherein when the determining unit determines that the object contacting the electrostatic touch panel is a drop of water, an indication that there is a drop of water on the electrostatic touch panel is displayed.

* * * * *